(12) United States Patent
Gottschalk-Gaudig et al.

(10) Patent No.: US 7,700,669 B2
(45) Date of Patent: Apr. 20, 2010

(54) RHEOLOGY CONTROL OF STRONGLY BASIC LIQUIDS

(75) Inventors: Torsten Gottschalk-Gaudig, Mehring (DE); Michael Dreyer, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 42 days.

(21) Appl. No.: 11/692,965

(22) Filed: Mar. 29, 2007

(65) Prior Publication Data
US 2007/0244223 A1 Oct. 18, 2007

(30) Foreign Application Priority Data
Apr. 13, 2006 (DE) .................. 10 2006 017 592

(51) Int. Cl.
*C08K 9/06* (2006.01)
(52) U.S. Cl. ............... 523/212; 106/490; 523/216; 524/492
(58) Field of Classification Search ............ 523/212, 523/216; 524/492; 106/490
See application file for complete search history.

(56) References Cited

U.S. PATENT DOCUMENTS

| 5,376,172 | A | * | 12/1994 | Tripp et al. | 106/490 |
| 5,665,156 | A | * | 9/1997 | Ettlinger et al. | 106/287.14 |
| 5,686,054 | A | * | 11/1997 | Barthel et al. | 423/335 |
| 5,686,523 | A | * | 11/1997 | Chen et al. | 524/547 |
| 7,109,256 | B2 | * | 9/2006 | Amano et al. | 523/212 |
| 2007/0110906 | A1 | * | 5/2007 | Edelmann et al. | 427/387 |

FOREIGN PATENT DOCUMENTS

| DE | 1163784 | A | | 2/1964 |
| DE | 2528134 | B2 | | 8/1976 |
| DE | 4419234 | A1 | | 12/1995 |
| DE | 102005022782 | A1 | | 11/2006 |
| JP | 06025512 | | * | 2/1994 |
| WO | 2005/003218 | A1 | | 1/2005 |

OTHER PUBLICATIONS

Tian et al., Humidity and Temperature Effect on Frictional Properties of Mica and Alkylsilane Monolayer Self-Assembled on Mica, Langmuir (1999), 15(1), 244-249.*
Aisa et al., Synthesis and characterization of long-chain silicon-containing hydroxy and methoxy compounds and glucopyranosides, Carbohydrate Research (1999), 321(3-4), 168-175.*
Ide et al., Preparation and some properties of organically modified layered alkali titanates with alkylmethoxysilanes, Journal of Colloid and Interface Science, (2006), 296(1), 141-149.*
Szabo et al., Monofunctional (dimethylamino)silane as silylating agent, Helvetica Chimica Acta (1984), 67(8), 2128-42.*
G. W. Sears, "Determination of Specific Surface Area of Colloidal Silica by Titration with Sodium Hydroxide", Anal. Chem. vol. 28 (1956), p. 1981.

* cited by examiner

*Primary Examiner*—Daniel M Sullivan
*Assistant Examiner*—Chukwuma O Nwaonicha
(74) *Attorney, Agent, or Firm*—Brooks Kushman P.C.

(57) ABSTRACT

Silicas modified with groups of the general formula (I)

$$R_a SiR^1_b O_c-\qquad (I)$$

where at least one of R or $R^1$ is a $>C_3$ hydrocarbon radical are useful in preparing stable dispersions of basic substances, the silica permitting a decrease in the shear viscosity h for a storage time of 1 week at room temperature (25° C.) to not more than 50% of the initial viscosity value, the viscosity being measured by means of cone/plate geometry with a shearing gap of 105 μm and a shear rate of $0.5\ s^{-1}$ at 25° C.

7 Claims, No Drawings

RHEOLOGY CONTROL OF STRONGLY BASIC LIQUIDS

BACKGROUND OF THE INVENTION

1. Field of the Invention

The invention relates to surface-modified pyrogenic silicas which are suitable as Theological additives in liquid media containing strongly basic groups, to the use of the silicas of the invention, and to their preparation.

2. Background Art

Pyrogenic (or fumed) silicas are widespread additives for controlling the flow properties of adhesives, sealants, and coating materials such as inks or paints. Pyrogenic silicas are used to adjust the viscosity, to adjust the shear-thinning and thixotropic properties, and to adjust the yield point.

For apolar systems of relatively high molecular weight with a high solvent fraction, it is preferred to use nonmodified, i.e., hydrophilic pyrogenic silicas. Surface-modified, i.e., hydrophobic silicas, such as silicas modified with dimethylsiloxy groups as described in DE 1163784, are preferably used in polar systems of low molecular weight with a low solvent content, or in solvent-free systems.

Establishing a viscosity or yield point that is stable over a prolonged period for liquids comprising components containing strongly basic groups, such as amine groups, has proven difficult. Driven by an acid-base reaction between the acidic silanol groups of the silica and the basic amine groups, hydrophilic silicas exhibit irreversible adsorption of the aminic component and hence deficient long-term stability of viscosity and yield point. Hydrophobic silicas, such as those modified with dimethylsiloxy groups, likewise exhibit inadequate long-term stability of viscosity and yield point.

SUMMARY OF THE INVENTION

It is an object of the invention to overcome the disadvantages of the prior and to provide a method of establishing, with long-term stability, viscosity and yield point for liquids which contain strongly basic groups. These and other objects are achieved by the use of silylated silica wherein the silyl groups contain at least one alkyl group with more than three carbon atoms.

DETAILED DESCRIPTION OF THE PREFERRED EMBODIMENT(S)

The invention provides silicas modified with groups of the general formula (I)

$$R_a SiR^1_b O_c— \qquad (I)$$

where
a can be 1, 2 or 3,
b can be 0, 1 or 2, and
c can be 1, 2 or 3, and
a+b+c=4, and
R is a monovalent, optionally mono-or polyunsaturated, optionally branched hydrocarbon radical having 1 to 24 carbon atoms,
$R^1$ can be a likewise monovalent, optionally mono- or polyunsaturated, optionally branched hydrocarbon radical having 1 to 20 carbon atoms,
it being necessary for at least one of the radicals, R or $R^1$, to be present greater than $C_3$ per molecule, and, in a dispersion comprising the silica and a liquid containing strongly basic groups, the silica permitting a decrease in the shear viscosity h for a storage time of 1 week at room temperature (25° C.) to not more than 50% of the initial viscosity value, the viscosity being measured by means of cone/plate geometry with a shearing gap of 105 μm at a shear rate of 0.5 s$^{-1}$ at 25° C.

Surprisingly, and in no way foreseeably by one skilled in the art, it has now been found that with pyrogenic silicas which have been surface-modified by long-chain alkylsilanes such that the silica surface has been modified very homogeneously, completely, and permanently, it is possible to achieve viscosities and yield points of liquids containing strongly basic groups stable in storage time. In this context it has unexpectedly been found that the suitable surface-treated silicas can be obtained with particular ease by thermal treatment in a temperature gradient.

The silicas that are suitable in accordance with the invention are modified with groups of the general formula (I)

$$R_a SiR^1_b O_c— \qquad (I)$$

where
a can be 1, 2 or 3,
b can be 0, 1 or 2, and
c can be 1, 2 or 3, and
a+b+c=4, and
R is a monovalent, optionally mono- or polyunsaturated, optionally branched hydrocarbon radical having 1 to 24 carbon atoms,
$R^1$ can be a likewise monovalent, optionally mono- or polyunsaturated, optionally branched hydrocarbon radical having 1 to 20 carbon atoms.

Radicals R are preferably alkyl radicals such as the methyl, ethyl, and propyl radicals, hexyl radicals, such as the n-hexyl and isohexyl radicals, octyl radicals such as the n-octyl and isooctyl radicals, the n-dodecyl, n-hexadecyl and n-octadecyl radicals. Radicals $R^1$ are preferably alkyl radicals such as the methyl, ethyl, and propyl radicals.

Preferred groups on the silica surface are:
trimethylsilyloxy-$CH_3Si(O—)_3$,
n-propylsilyltrioxy-$C_3H_7Si(O—)_3$,
n-hexylsilyltrioxy-$C_6H_{13}Si(O—)_3$,
n-octylsilyltrioxy-$C_8H_{17}Si(O—)_3$,
isooctylsilyltrioxy-$C_8H_{17}Si(O—)_3$,
n-octylmethylsilyldioxy-$C_8H_{17}SiCH_3(O—)_2$,
isooctylmethylsilyldioxy-$C_8H_{17}SiCH_3(O—)_2$,
n-hexadecylsilyltrioxy-$C_{16}H_{33}Si(O—)_3$,
n-hexadecylmethylsilyldioxy-$C_{16}H_{33}SiCH_3(O—)_2$,
n-dodecylsilyltrioxy-$C_{18}H_{37}Si(O—)_3$,
n-dodecylmethylsilyldioxy-$C_{18}H_{37}SiCH_3(O—)_2$, Particularly preferred are
n-octylsilyltrioxy-$C_8H_{17}Si(O—)_3$,
isooctylsilyltrioxy-$C_8H_{17}Si(O—)_3$,
n-octylmethylsilyldioxy-$C_8H_{17}SiCH_3(O—)_2$,
n-hexadecylsilyltrioxy-$C_{16}H_{33}Si(O—)_3$,
n-dodecylsilyltrioxy-$C_{18}H_{37}Si(O—)_3$.

The silica surface can be modified exclusively with one type of group or simultaneously with different groups. Preference is given to the modification with exclusively one kind of group.

The surface-modified silica can be prepared in continuous or batchwise processes, and the method of modification may be composed of one or more steps. The surface-modified silica is preferably prepared by means of a process where the preparation takes place in separate steps: (A) first, preparation of the hydrophilic silica, (B) the modification of the silica with (1) loading of the hydrophilic silica with silanes of the general formula II, $$R_aSiR^1{}_bX_c \qquad (II)$$

where R, $R^1$, a, b, and c are as defined above and X=halogen, a nitrogen radical, $OR^1$, $OCOR^1$ or $O(CH_2)_xOR^1$ and x=1, 2 or 3, (2) reaction of the silica with the applied compounds, and (C) purification of the silica to remove excess applied compounds and by-products.

The surface treatment is preferably conducted in an atmosphere which does not lead to oxidation of the modified silica, i.e., preferably less than 10% by volume percent of oxygen, more preferably less than 2.5% by volume, the best results being achieved with less than 1% by volume of oxygen.

Covering, reaction, and purification can be carried out as a discontinuous or continuous operation. For technical reasons a continuous reaction regime is preferred.

Covering (step B) takes place preferably at temperatures from −30 to 250° C., preferably 20 to 150° C., with particular preference 20 to 80° C. In one special embodiment the covering step takes place at 30 to 50° C. The residence time is 1 min-24 h, preferably 15 min to 300 min, and with particular preference, for reasons of the space-time yield, 15 min to 240 min, while the pressure in the covering operation ranges from a slight underpressure of down to 0.2 bar up to an overpressure of 100 bar, preference being given for technical reasons to standard pressure, in other words, unpressurized operation as compared with external atmospheric pressure.

The silanes of the general formula II are preferably added in solid form, and are admixed in particular to the silica in powder form. These compounds may be admixed in pure form or as solutions in known industrial solvents, for example alcohols such as methanol, ethanol or isopropanol; ethers such as diethyl ether, THF or dioxane; or hydrocarbons such as hexanes or toluene. The concentration in the solution is 5-95% by weight, preferably 30-95% by weight, more preferably 50-95% by weight.

Admixing preferably takes place by nozzle techniques or comparable techniques, such as effective atomization techniques, for example atomization in 1-fluid nozzles under pressure (preferably 5 to 20 bar), spraying in 2-fluid nozzles under pressure (preferably gas and liquid, 2-20 bar), ultrafine division with atomizers or gas/solid exchange assemblies with movable, rotating or static internals which permit homogeneous distribution of the silanes of the general formula II with the silica in powder form.

The aerosol can be applied to the fluidized solid from above through nozzles, or can be introduced into the fluidized solid, preference being given to atomization from above onto the product. The silanes of the general formula II are added preferably in the form of an aerosol with ultrafine division, characterized in that the aerosol has a settling velocity of 0.1-20 cm/s.

The loading of the silica and the reaction with the silanes of the general formula II preferably take place under mechanical or gasborne fluidization. Mechanical fluidization is particularly preferred.

Gasborne fluidization can be by means of all inert gases which do not react with the silane of the general formula II, with the silica, and with the modified silica—that is, which do not lead to side reactions, degradation reactions, oxidation events or flame or explosion phenomena, such as, preferably, $N_2$, Ar, other noble gases, $CO_2$, etc. The fluidizing gases are supplied preferably at superficial gas velocities of from 0.05 to 5 cm/s, more preferably of 0.5-2.5 cm/s.

Particular preference is given to mechanical fluidization, which takes place, without additional employment of gas beyond that used for inertization, by means of paddle stirrers, anchor stirrers, and other suitable stirring elements.

In one particularly preferred version unreacted silanes of the general formula II and exhaust gases from the purification step are recycled to the step of covering and loading of the silica; this recycling may be partial or complete, accounting preferably for 10%-90% of the overall volume flow of the gases emerging from the purification step, and preferably takes place in suitably thermostated apparatus.

Recycling also preferably takes place in a non-condensed phase, i.e., in the form of gas or of vapor. Recycling may take place as mass transport along a pressure equalization or as controlled mass transport with the standard industry gas transport systems, such as fans, pumps, and compressed-air membrane pumps. Since it is preferred to recycle the non-condensed phase it may be advisable to heat the recycle lines.

The recycling of the unreacted silanes of the general formula II and of the exhaust gases may be situated in this case at between 5% and 100% by weight, preferably, based on their total mass, more preferably between 30% and 80% by weight. This recycling may amount to between 1 and 200 parts per 100 parts of freshly employed silane, preferably 10 to 30 parts. The recycling of the purification products from the modification reaction to the covering step is preferably continuous.

The reaction takes place preferably at temperatures of 20-350° C., more preferably 200-300° C., and with particular preference at 40-300° C., and preferably takes place in a temperature gradient in the range from 20° C. to 350° C., i.e., the reaction temperature rises over the course of the reaction time. This means that at the beginning of the reaction the wall temperature of the reaction vessel is in a range of 20-180° C., preferably in a range of 40-150° C., and additionally, the product temperature at the beginning of the reaction is in a range of 20-180° C., preferably in a range of 40-150° C. Toward the end of the reaction, the wall temperature of the reaction vessel is in a range of 120-350° C., preferably 150-300° C. This means, furthermore, that the product temperature at the end of the reaction is in a range of 120-350° C., preferably of 150-300° C.

Depending on operational implementation, i.e., continuous or discontinuous operational implementation, the temperature gradient as a function of location may be dT/dx (continuous) or dependent on the time, dT/dt (discontinuous).

The reaction temperature, i.e., the wall temperature or product temperature and its gradient, may be achieved in accordance with the following methods.

1. Continuous Operation (i.e., dT/dx):

The silica is conveyed by means of gasborne or mechanical fluidization/conveying through a heating zone with increasing wall temperature. The wall temperature may in this case increase continuously or in steps. In the case of a stepped increase the reaction zone may consist of up to 10 separate heating zones of different temperatures, preferably 5 separate heating zones of different temperatures, more preferably 3 separate heating zones of different temperatures, and in one specific embodiment of 2 separate heating zones of different temperatures. Where appropriate it is possible for the individual heating zones to be separated from one another by valves. The reaction vessel may be vertical or horizontal. Preference is given to the vertical embodiment. In the case of a vertical embodiment, the silica may traverse the reaction zone from bottom to top or from top to bottom. From top to bottom is preferred.

In a further embodiment, the silica is conveyed by means of gasborne or mechanical fluidization/conveying through separate reaction vessels with different, i.e., increasing wall temperatures. The reaction cascade may in this case be composed of up to 10 reaction vessels of different wall temperatures, preferably up to 5 reaction vessels of different wall temperatures, more preferably up to 3 reaction vessels of different wall temperatures, and in one specific embodiment may be composed of 2 reaction vessels of different wall temperatures. The reaction vessels may be vertical or horizontal. The vertical embodiment is preferred. In the case of a vertical embodiment, the silica may traverse the reaction zone from bottom to top or from top to bottom. From top to bottom is preferred.

In a yet further embodiment, the silica is conveyed by means of mechanical fluidization/conveying through a vertically standing reaction vessel. The reaction vessel is heated in its lower section to the maximum reaction temperature. Within the reaction vessel a temperature gradient then comes about between the upper part of the reaction vessel (lowest temperature) and the lower part of the reaction vessel (highest temperature). This can be controlled, for example, by means of appropriate stirring technology.

2. Discontinuous Production (Batch Operation):

The silica is fluidized by means of inert gas or mechanical stirring in the reaction vessel. In the course of the reaction period the reaction temperature in the reaction vessel is raised successively, i.e., in the form of a ramp or stepwise.

The residence time per reaction temperature is between 5 min and 240 min, preferably between 10 min and 180 min and more preferably between 15 min and 120 min. The reaction zone may be heated, for example via the vessel wall by means for example of electrical heating or by means of thermal conditioning fluid or steam. Where appropriate, heating coils, for example, may be used in the reaction vessel, or where appropriate, heating may take place from the outside via infrared lamps.

The wall temperature and product temperature may be measured by means of typically employed measurement instruments such as thermocouples, resistance thermometers, bimetal thermometers, IR sensors or others. The total reaction time is 10 min to 48 h, preferably 15 min to 5 h, more preferably 15 min to 4 h.

Where appropriate it is possible to add protic solvents, such as liquid or vaporizable alcohols or water; typical alcohols are isopropanol, ethanol, and methanol. It is also possible to add mixtures of the abovementioned protic solvents. It is preferred to add 1 to 50% by weight of protic solvent, based on the silica, more preferably 5% to 25%. Water is particularly preferred.

Optionally it is possible to add acidic catalysts, of acidic nature in the sense of a Lewis acid or a Brönsted acid, such as hydrogen chloride, or basic catalysts, of basic character in the sense of a Lewis base or a Brönsted base, such as ammonia or amines such as triethylamine. These are preferably added in traces, i.e., at less than 1000 ppm. With particular preference no catalysts are added.

The purification (step C) takes place preferably at a temperature of 20 to 200° C., more preferably 50° C. to 180° C., with particular preference of 50 to 150° C. The purification step is preferably characterized by agitation, with preference being given particularly to slow agitation and slight mixing. The stirring elements are set and agitated advantageously in such a way that, preferably, mixing and fluidization occur, but not complete vortexing.

The purification step may additionally be characterized by an increased gas input, corresponding to a superficial gas velocity of preferably 0.001 to 10 cm/s, more preferably 0.01 to 1 cm/s. This can be done by means of inert gases which do not react with the silanes of the general formula II, the silica, and the modified silica, i.e., do not lead to side reactions, degradation reactions, oxidation events or flame or explosion phenomena, such as, preferably $N_2$, Ar, other noble gases, $CO_2$, etc.

In addition it is possible, during the modification or following the purification, to employ methods for the mechanical compaction of the silica, such as for example, press rollers, milling assemblies, such as edge runner mills and such as ball mills, continuously or batchwise, compaction by screws or worm mixers, worm compactors, briqueting machines, or compaction by suction withdrawal of the air or gas present, by means of suitable vacuum methods.

Particular preference is given to mechanical compaction during the modification, in step (II) of the reaction, by means of press rollers, abovementioned milling assemblies such as ball mills, or compaction by means of screws, worm mixers, worm compactors, briqueting machines.

In a further particularly preferred procedure, purification is followed by deployment of methods for the mechanical compaction of the silica, such as compaction by suction withdrawal of the air or gas present, by means of suitable vacuum methods, or press rollers, or a combination of both methods.

Additionally it is possible in one particularly preferred procedure, following purification, to employ methods for deagglomerating the silica, such as pin-disk mills, hammer mills, opposed-flow mills, impact mills or milling/classifying devices.

The silicas of the invention exhibit surface modification which is complete as far as possible. This means that the residual silanol group density of the silica is less than 1.0 SiOH groups/$nm^2$, preferably less than 0.75 SiOH group/$nm^2$, and most preferably less than 0.5 SiOH groups/$nm^2$. A suitable method of determining the residual silanol content after modification is that of acid-based titration, as described for example in G. W. Sears, Anal. Chem. 28 (1956) 1981.

The silicas of the invention exhibit highly permanent modification of the silica surface with alkylsilanes. A suitable method of evaluating the permanence of a modification is that of quantitative determination of extractable silane, i.e., silane not attached chemically to the silica surface. The suitable silicas are distinguished by the fact that they have an extractable fraction of less than 8% by weight, preferably less than 6% by weight, and more preferably of less than 5% by weight.

The silicas of the invention have a chemical modification ratio f of 0.5 to 3, preferably 0.75 to 2, and very preferably 0.8 to 1.5. The chemical modification ratio f is defined as f=(n(silane)−n(extractable silane)/n(silanol content)−n(residual silanol content), where n(silane) is the amount of silane per 100 $m^2$/g specific starting silica surface, obtainable by the carbon content of the silica, n(extractable silane) is the amount of extractable silane per 100 $m^2$/g specific starting silica surface area, determined quantitatively by means of extraction and subsequent Si-AAS measurement, n(silanol content) is the silanol content of a hydrophilic pyrogenic silica per 100 $m^2$/g specific starting silica surface area, determined by means of acid-base titration, which from experience is approximately 0.0003 mol per 100 $m^2$/g of specific silica surface area, and n(residual silanol content) is the residual content per 100 $m^2$/g specific surface area of the hydrophilic starting silica, determined by means of acid-base titration.

In one preferred embodiment the silicas of the invention have a shielded fraction of the silicatic surface, $S_a$, as a result of the surface modification of greater than 50%, preferably greater than 60%. The fraction of the shielded surface is given by the formula $S_a$=(n(silane)−n(extractable silane)*$N_A$* S(silane))/100 $m^2$, where n(alkylsilane) is the amount of silane per 100 $m^2$/g of specific silica surface area of the hydrophilic starting silica, obtainable via the carbon content of the silica, n(extractable silane) is the extractable amount of silane per 100 m²/g of specific silica surface area of the hydrophilic starting silica, determined quantitatively by means of extraction and subsequent Si-AAS measurement, $N_A$ is Avogadro's constant, and S(silane) is the molecular net area of the silane used correspondingly. S(Silane) is obtainable from S(silane) =1.33* $N_A^{1/3}$*(M(silane)/d(silane))$^{2/3}$/$N_A$, where M(silane) is the molar mass of the silane and d(silane) is the density.

The invention further provides a method of stably setting the flow properties of basic substances and substance mixtures, adding silicas of the invention.

The basic substances and substance mixtures are preferably liquid media which are set in accordance with the invention, these media being liquids, in single-substance or mixture form, which contain strongly basic groups and/or compounds, such as hydroxide ions, ammonia, low molecular mass amines such as trialkylamine such as trimethylamine, triethylamine, pyridines and other basic N-heterocycles, aliphatic polyamines such as ethylenediamine or higher derivatives thereof such as diethylenetriamine or triethylenetetramine or hexyldiamine, cycloaliphatic polyamines such as isophoronediamine or cyclohexyldiamine, Mannich bases, aromatic polyamines such as anilines such as methylenedianiline, 4,4-diaminodiphenylsulfone, m-xylenediamine, amino-containing oligomers or polymers such as diaminopolyethylene oxides or diaminopolypropylene oxides such as Jeffamines, polyamidoamines such as reaction products of fatty acids and polyamines, imidazolines, polyaminoamide adducts such as reactions of excess polyamines or polyamides with epoxy resins, dicyanamide, and others.

The silicas of the invention give rise to dispersions of silicas in liquids containing strongly basic groups that are distinguished by excellent storage stability of the viscosity.

This means in particular that the shear viscosity η after a storage time of 1 week at room temperature has dropped at most to 50% of the initial level, preferably at most to 80% of the initial level, and most preferably at most to 90% of the initial level, the viscosity being measured by means of cone/plate geometry with a shearing gap of 105 μm and a shear rate of 0.5 s$^{-1}$ at 25° C.

This means, furthermore, that after a storage time of 4 weeks at 40° C. the shear viscosity η has dropped at most to 50% of the initial level, preferably at most to 80% of the initial level, and most preferably at most to 90% of the initial level, the viscosity being measured by means of cone/plate geometry with a shearing gap of 105 μm and a shear rate of 0.5 s$^{-1}$ at 25° C.

This means, furthermore, that thixotropic index TI after a storage time of 4 weeks at 40° C. has dropped at most to 50% of the initial layer, preferably at most 80% of the initial level, and with particular preference at most to 90% of the initial level. This thixotropic index TI is defined as the ratio of the shear viscosity $\eta_{05}$ at a shear rate of 0.5 s$^{-1}$ divided by the shear rate $\eta_{500}$ at a shear rate of 500 s$^{-1}$, the viscosity being measured by means of cone/plate geometry with a shearing gap of 105 μm and a shear rate of 0.5 s$^{-1}$ at 25° C. The viscosities are determined using a measurement profile made up of section 1, 120 s of shearing at 0.5 s$^{-1}$, section 2, 10 s of shearing at 500 s$^{-1}$, and section 3, 180 s of shearing at 0.5 s$^{-1}$. The thixotropic index TI is then obtained from the average value of the last 10 data points from section 3 divided by the last data point from section 2, a data point being determined every 2 seconds in section 3 and a data point being determined every second in section 2.

When the silicas of the invention are used in accordance with the invention the liquids containing basic groups, viscoelastic solid behavior may occur. This means that in the case of a rheological deformation experiment in oscillation, the storage modulus G' is greater than the loss modulus G", this effect occurring with a silica content in the dispersion of greater than 1% by weight, preferably at a silica content of greater than 1.5% by weight. The moduli G' and G" can be determined in accordance with the equation τ=γ(t)*(G'sinωt+ G"cosωt), where τ is the strain response of the sample to the change in deformation over time, γ(t), for a maximum amplitude $γ_0$ and the angular velocity is ω, i.e., γ(t)=$γ_0$ sinωt. The determination of the amounts of G' and G" is made in the plateau region of the storage modulus G', which commonly occurs for deformations smaller than 0.1, at a constant angular velocity ω of 10 rad/s and in a deformation range which normally extends over the range from approximately 10$^{-3}$ to approximately 10.

The inventive use of the silicas of the invention is distinguished by particular long-term stability of the viscoelastic solid behavior. This means that after a storage time of 1 week at room temperature, the storage modulus G' has dropped at most to 50% of the initial level, preferably at most to 80% of the initial level, and most preferably at most to 90% of the initial level, the modulus being measured by means of cone/plate geometry with a shearing gap of 105 μm at a temperature of 25° C.

This means, furthermore, that the storage modulus G', after a storage time of 4 weeks at 40° C., has dropped at most to 50% of the initial level, preferably at most to 80% of the initial level, and with very particular preference at most to 90% of the initial level, the modulus being measured by means of cone/plate geometry with a shearing gap of 105 μm at a temperature of 25° C.

When the silicas are used in accordance with the invention there may be a yield point $τ_c$ occurring. Yield point means here that a material exhibits fluid behavior only at and beyond a particular force loading.

The yield point $τ_c$ is defined here as the shearing stress at which the transition occurs from the viscoelastic solid to a viscoelastic fluid. This transition is characterized in that the loss factor tan δ, defined as the ratio G"/G', as a function of the applied shearing stress τ, takes on a value of 1.

The use of the silicas of the invention in accordance with the invention is distinguished by particular long-term stability of the yield point. This means that, after a storage time of 1 week at room temperature the yield point $τ_c$ has dropped at most to 50% of the initial level, preferably to at most 80% of the initial level, and most preferably at most to 90% of the initial level, the yield point $τ_c$ being determined from a rheological stress experiment in oscillation with a circular frequency ω of 10 rad/s in a stress range τ from 0.1 Pa to 2 $τ_c$ by means of cone/plate geometry with a shearing gap of 105 μm at a temperature of 25° C.

This means, moreover, that, after a storage time of 4 weeks at 40° C., the yield point $τ_c$ has dropped at most to 50% of the initial level, preferably at most to 80% of the initial level, and most preferably at most to 90% of the initial level, the yield point $τ_c$ being measured by means of cone/plate geometry with a shearing gap of 105 μm at a temperature of 25° C.

EXAMPLES

Preparation of the Modified Silica:

Example 1

At a temperature of 25° C. and under $N_2$ inert gas, 100 g of hydrophilic silica with a moisture content of less than 1%, an HCl content of less than 100 ppm, and a specific surface area of 200 m²/g (measured by the BET method in accordance with DIN 66131 and 66132) (available under the name HDK® N20 from Wacker Chemie A G, Munich, Germany) are admixed by atomization through a two-fluid nozzle (pressure: 5 bar) with 4.0 g of aqueous $NH_3$ solution (25% strength) and then with 21 g of hexadecyltrimethoxysilane. The silica thus loaded is reacted, for a total residence time of 3 hours, at 120° C. for 1 h and then at 250° C. for 2 h in a 100 l drying cabinet under $N_2$. The analytical data are set out in Table 1.

Example 2

In a continuous apparatus, at a temperature of 30° C. and under $N_2$ inert gas, a mass flow of 1200 g/h of hydrophilic silica with a moisture content of less than 1%, an HCl content of less than 100 ppm, and a specific surface area of 200 m²/g (measured by the BET method in accordance with DIN 66131 and 66132) (obtainable under the name HDK N20® from Wacker Chemie A G, Munich, Germany) is admixed through two-fluid nozzles (pressure 5 bar) with 60 g/h of aqueous $NH_3$ solution (25% strength) and with 120 g/h of octylmethyldimethoxysilane in liquid, ultrafinely divided form. The silica thus loaded is reacted, with a total residence time of 3 hours, for 1 h in a reaction vessel at 140° C. and then in a further reaction vessel for 2 h at a temperature of 280° C., in the course of which it is fluidized by stirring, and is then purified in a dryer at 150° C. with a residence time of 1 hour. The analytical data are set out in Table 1.

Comparative Example C3

At a temperature of 25° C. and under $N_2$ inert gas, 100 g of hydrophilic silica with a moisture content of less than 1%, an HCl content of less than 100 ppm, and a specific surface area of 200 m²/g (measured by the BET method in accordance with DIN 66131 and 66132) (obtainable under the name HDK N20® from Wacker-Chemie A G, Munich, Germany) are admixed by atomization through a two-fluid nozzle (pressure 5 bar) with 4.0 g/h of aqueous $NH_3$ solution (25% strength) and then with 21 g of hexadecyltrimethoxysilane. The silica thus loaded is reacted for a residence time of 2 h at 150° C. in a 100 l drying cabinet under $N_2$.

The analytical data are set out in Table 1.

TABLE 1

| Example | % C | n(residual SiOH) mol/100 m² | n(extractable silane) mol/100 m² | f | $S_a$ |
|---|---|---|---|---|---|
| 1 | 9.2 | $6.89 \cdot 10^{-5}$ | $1.88 \cdot 10^{-5}$ | 1.11 | 1.33 |
| 2 | 3.9 | $1.33 \cdot 10^{-4}$ | $2.38 \cdot 10^{-5}$ | 0.97 | 0.65 |
| C3 | 8.9 | $1.43 \cdot 10^{-4}$ | $1.65 \cdot 10^{-4}$ | 0.61 | 0.52 |

Description of the Analytical Methods
1. Carbon Content (% C)
Elemental analysis for carbon; combustion of the sample at above 1000° C. in a stream of $O_2$, detection and quantification of the resultant $CO_2$ by IR; instrument LECO 244
2. Residual Non-modified Silica Silanol Group Content
   method: acid-base titration of the silica suspended in water/methanol=50:50; titration in the region above the pH range of the isoelectric point and below the pH range of dissolution of the silica
   untreated silica with 100% SiOH (silica surface silanol groups): SiOH-phil=2 $SiOH/nm^2$ silylated silica: SiOH-silyl
   residual silica silanol content: % SiOH=SiOH-silyl/SiOH-phil*100% (by analogy with G. W. Sears, Anal. Chem, 28 (12), (1950), 1981)
3. Extractable Silylating Agent
25 g of silica are incorporated into 100 g of THF using a spatula, and then the silica and THF are stirred to a liquid consistency using a Dispermat CA-40-C dissolver (Getzmann) with a 40 mm toothed disk, accompanied by ice cooling, after which the silica and THF are sheared at 8400 rpm for 60 s, then equilibrated with ultrasound for 60 minutes, and, after 2 days, clear filtrate is separated off via a pressure filtration. The filtrate is analyzed for its silicon content by means of atomic absorption spectroscopy (AAS). Detection limit <100 ppm of organosilicon compounds relative to silica.

Particle Dispersions:

Example 4

15 g of a silica from Example 1 are incorporated over the course of 15 minutes into 285 g of a typical epoxy resin hardener consisting of 41% by weight of a polyamide having an amine number of approximately 375 (e.g., EPI-CURE Curing Agent 3140 from Resolution), 22% by weight of a polyether polyamine (Jeffamine D400 from Huntsman), 4% by weight of TETA (triethylenetetraamine) and 10% by weight of IPD (isophoronediamine) by stirring by means of a Dispermat CA-40-C dissolver (Getzmann) with a 5 cm toothed disk at 600 rpm and then dispersed down to a particle size (grindometer value) of 90 μm at a peripheral speed of 10 m/s under a vacuum of 80 torr and with cooling with refrigerated water for 10 min. Storage data of the dispersion are summarized in Table 2.

Example 5

15 g of a silica from Example 2 are incorporated over the course of 15 minutes into 285 g of a typical epoxy resin hardener consisting of 41% by weight of a polyamide having an amine number of approximately 375 (e.g., EPI-CURE Curing Agent 3140 from Resolution), 22% by weight of a polyether polyamine (Jeffamine D400 from Huntsman), 4% by weight of TETA (triethylenetetraamine) and 10% by weight of IPD (isophoronediamine) by stirring by means of a Dispermat CA-40-C dissolver (from Getzmann) with a 5 cm toothed disk at 600 rpm and then dispersed down to a particle size (grindometer value) of 90 μm at a peripheral speed of 10 m/s under a vacuum of 80 torr and with cooling with refrigerated water for 10 min. Storage data of the dispersion are summarized in Table 2.

Comparative Example C6

15 g of a PDMS-modified silica having a carbon value of approximately 4.5% by weight and a specific BET surface area of the starting silica of 200 m²/g (e.g., HDK® H18 from Wacker-Chemie A G, Munich) are incorporated over the course of 15 minutes into 285 g of a typical epoxy resin hardener consisting of 41% by weight of a polyamide having an amine number of approximately 375 (e.g., EPI-CURE Curing Agent 3140 from Resolution), 22% by weight of a polyether polyamine (Jeffamine D400 from Huntsman), 4% by weight of TETA (triethylenetetraamine) and 10% by weight of IPD (isophoronediamine) by stirring by means of a Dispermat CA-40-C dissolver (Getzmann) with a 5 cm toothed disk at 600 rpm and then dispersed down to a particle size (grindometer value) of 90 μm at a peripheral speed of 10 m/s under a vacuum of 80 torr and with cooling with refrigerated water for 10 min. Storage data of the dispersion are summarized in Table 2.

Comparative Example C7

15 g of a silica from Example 3 are incorporated over the course of 15 minutes into 285 g of a typical epoxy resin hardener consisting of 41% by weight of a polyamide having an amine number of approximately 375 (e.g., EPI-CURE Curing Agent 3140 from Resolution), 22% by weight of a polyether polyamine (Jeffamine D400 from Huntsman), 4% by weight of TETA (triethylenetetraamine) and 10% by weight of IPD (isophoronediamine) by stirring by means of a Dispermat CA-40-C dissolver (Getzmann) with a 5 cm toothed disk at 600 rpm and then dispersed down to a particle size (grindometer value) of 90 μm at a peripheral speed of 10 m/s under a vacuum of 80 torr and with cooling with refrigerated water for 10 min. Storage data of the dispersion are summarized in Table 2.

TABLE 2

|  | $h_{05}(7\,d)/h_{05}(1\,d)$ | TI(4 W)/TI(1 d) |
|---|---|---|
| Example 4 | 0.94 | 0.9 |
| Example 5 | 0.91 | 0.925 |
| Example C6 | 0.08 | 0.06 |
| Example C7 | 0.3 | 0.1 |

Description of the Analytical Methods

Ratio of the shear viscosities $h_{05}(7\,d)/h_{05}(1\,d)$ and thixotropic index TI(4 W)/TI(1 d): the shear viscosity is measured by means of an airborne rheometer with cone/plate geometry with a shearing gap of 105 μm at 25° C. The viscosity is determined using a measurement profile consisting of section 1, 120 s of shearing at 0.5 s$^{-1}$, section 2, 10 s of shearing at 500 s$^{-1}$, and section 3, 180 s of shearing at 0.5 s$^{-1}$. The thixotropic index TI is then given by the average value of the last 10 data points from section 3 divided by the last data point from section 2, a data point being determined every 2 s in sections 1 and 3 and every second in section 2. The shear viscosity at 0.5 s$^{-1}$ ($h_{05}$) is calculated from the averaged 10 last data points of section 1.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A pyrogenic silica powder modified with groups of the general formula (I)

where —Si≡ is a silicon atom of the silica,
a is 1, 2 or 3,
b is 0, 1 or 2, and
c is 1, 2 or 3, and
a+b+c=4, and
R is a monovalent, optionally mono- or polyunsaturated, optionally branched hydrocarbon radical having 1 to 24 carbon atoms, R$^1$ is a monovalent, optionally mono- or polyunsaturated, optionally branched hydrocarbon radical having 1 to 20 carbon atoms,
it being necessary for at least one of the radicals, R or R$^1$, present to have more than 3 carbon atoms per molecule, the silica prepared by silylating with a silane having at least one hydrocarbon group with more than 3 carbon atoms, the silylating taking place in a temperature gradient wherein the temperature reaches a temperature in the range of 120° C. to 350° C. and, wherein in a dispersion comprising the silica and a liquid containing strongly basic groups, the silica permitting a decrease in the shear viscosity η after a storage time of 1 week at room temperature (25° C.) to not more than 50% of the initial viscosity of the dispersion.

2. A pyrogenic silica modified with groups of the general formula (I)

where —Si≡ is a silicon atom of the silica,
a is 1, 2 or 3,
b is 0, 1 or 2, and
c is 1, 2 or 3, and
a+b+c=4, and
R is a monovalent, optionally mono- or polyunsaturated, optionally branched hydrocarbon radical having 1 to 24 carbon atoms,
R$^1$ is a monovalent, optionally mono- or polyunsaturated, optionally branched hydrocarbon radical having 1 to 20 carbon atoms,
it being necessary for at least one of the radicals, R or R$^1$, present to have more than 3 carbon atoms per molecule, the silica prepared by silylating with a silane having at least one hydrocarbon group with more than 3 carbon atoms, the silylating taking place in a temperature gradient and, wherein in a dispersion comprising the silica and a liquid containing strongly basic groups, the silica permitting a decrease in the shear viscosity η after a storage time of 1 week at room temperature (25° C.) to not more than 50% of the initial viscosity of the dispersion,
wherein the pyrogenic silica modified with groups of the formula (I) has a chemical modification ratio f of 0.5 to 3, the chemical modification ratio f being defined as f=(n(alkylsilane)–n (extractable silane)/n(silanol content)–n(residual silanol content), where n(alkylsilane) is the amount of silane per 100 m$^2$/g specific starting silica surface, obtainable via the carbon content of the silica, n(extractable silane) is the amount of extractable silane per 100 m$^2$/g specific starting silica surface area, determined quantitatively by means of extraction and subsequent Si-AAS measurement, n(silanol content) is the silanol content of a hydrophilic pyrogenic silica per 100 m$^2$/g specific starting silica surface area, determined by means of acid-base titration, and n(residual silanol content) is the residual content per 100 m$^2$/g specific starting silica surface area, determined by means of acid-base titration.

3. A process for preparing the silica of claim 1, comprising reacting the silica with an alkylsilane under a temperature gradient in the range from 20° C. to 350° C.

4. The process for preparing the silica of claim 3, wherein the alkylsilane comprises at least one silane of the formula II

wherein X is halogen, a nitrogen radical, OR$^1$, OCOR$^1$, or O(CH$_2$)$_x$OR$^1$ and x is 1, 2, or 3.

5. A pyrogenic silica modified with groups of the general formula (I)

$$R_aSiR^1{}_b(O\text{—}Si\equiv)_c \qquad (I)$$

where —Si≡ is a silicon atom of the silica,
a is 1, 2 or 3,
b is 0, 1 or 2, and
c is 1, 2 or 3, and
a+b+c=4, and
R is a monovalent, optionally mono- or polyunsaturated, optionally branched hydrocarbon radical having 1 to 24 carbon atoms,
$R^1$ is a monovalent, optionally mono- or polyunsaturated, optionally branched hydrocarbon radical having 1 to 20 carbon atoms,
it being necessary for at least one of the radicals, R or $R^1$, present to have more than 3 carbon atoms per molecule, the silica prepared by silylating with a silane having at least one hydrocarbon group with more than 3 carbon atoms, the silylating taking place at a temperature of from 20° C. to 350° C., in a temperature gradient wherein at the beginning of the silylation the temperature is in the range of 20° C. to 180° C., and at the end of the silylation, the temperature is higher than at the beginning and is in the range of 120° C. to 350° C., the increase in temperature from the beginning of silylation to the end of silylation being continuous or stepwise, and,
wherein in a dispersion comprising the silica and a liquid containing strongly basic groups, the silica permitting a decrease in the shear viscosity η after a storage time of 1 week at room temperature (25° C.) to not more than 50% of the initial viscosity of the dispersion.

6. The silica of claim 5, which has a chemical modification ratio f of 0.5 to 3, the chemical modification ratio f being defined as f=(n(alkylsilane)−n(extractable silane)/n(silanol content)−n(residual silanol content), where n(alkylsilane) is the amount of silane per 100 $m^2/g$ specific starting silica surface, obtainable via the carbon content of the silica, n(extractable silane) is the amount of extractable silane per 100 $m^2/g$ specific starting silica surface area, determined quantitatively by means of extraction and subsequent Si-AAS measurement, n(silanol content) is the silanol content of a hydrophilic pyrogenic silica per 100 $m^2/g$ specific starting silica surface area, determined by means of acid-base titration, and n(residual silanol content) is the residual content per 100 $m^2/g$ specific starting silica surface area, determined by means of acid-base titration.

7. The process for preparing the silica of claim 5, wherein the alkylsilane comprises at least one silane of the formula II

$$R_aSiR^1{}_bX_c \qquad (II),$$

wherein X is halogen, a nitrogen radical, $OR^1$, $OCOR^1$, or $O(CH_2)_xOR^1$ and x is 1, 2, or 3.

* * * * *